No. 12,322. REISSUED FEB. 28, 1905.

C. E. DAWSON.

VAPORIZING DEVICE FOR EXPLOSIVE ENGINES.

APPLICATION FILED FEB. 27, 1903.

WITNESSES=

William V. McKnight.

Henry Sutter.

INVENTOR,

Chas. E. Dawson, by Jno. Fecher

No. 12,322. Reissued February 28, 1905.

UNITED STATES PATENT OFFICE.

CHARLES ERNEST DAWSON, OF CLEVELAND, OHIO.

VAPORIZING DEVICE FOR EXPLOSIVE-ENGINES.

SPECIFICATION forming part of Reissued Letters Patent No. 12,322, dated February 28, 1905.

Original No. 668,953, dated February 26, 1901. Application for reissue filed February 27, 1903. Serial No. 145,453.

*To all whom it may concern:*

Be it known that I, CHARLES ERNEST DAWSON, a subject of the King of Great Britain, and a resident of Cleveland, county of Cuyahoga, and State of Ohio, have invented certain new and useful Improvements in Vaporizing Devices for Explosive-Engines, of which the following is a specification, the principle of the invention being herein explained and the best mode in which I have contemplated applying that principle, so as to distinguish it from other inventions.

My invention relates to explosion oil-engines in which the combustible mixture is formed by vaporizing heavy oil, such as "Royal Daylight" and other lamp-oils.

The object of my invention is to provide a vaporizer which will not decompose the oil and produce tar, the vaporizer being heated during the running of the engine by heat obtained from the waste gases and the heat so obtained being carefully regulated by limiting conduction, so that the vaporizer is always kept at a low temperature sufficient for vaporizing, but not sufficient to cause destructive distillation and the production of tar. I have found by experiment that exhaust-vaporizers are very easily overheated, and I have so devised my new vaporizer that the heat reaching it from the exhaust never exceeds the amount necessary to vaporize and heat the oil and entering air charge to a temperature but little exceeding 212° Fahrenheit.

Figure 1:
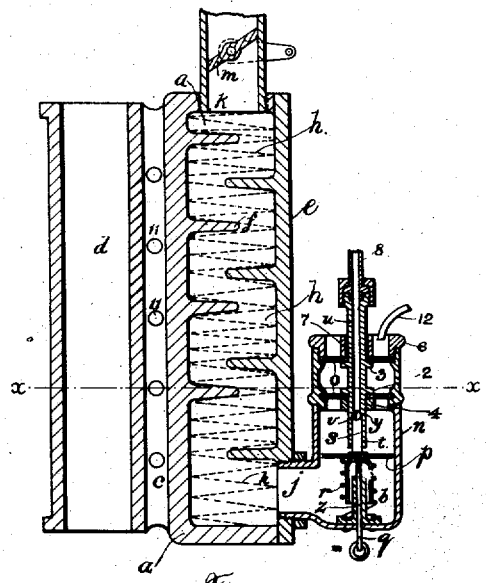
Figure 2:
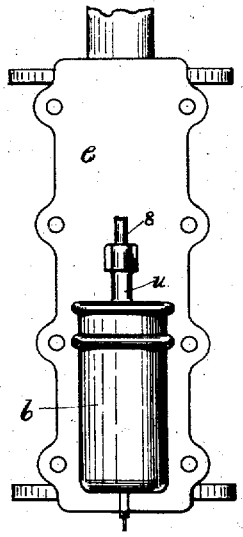
Figure 3:
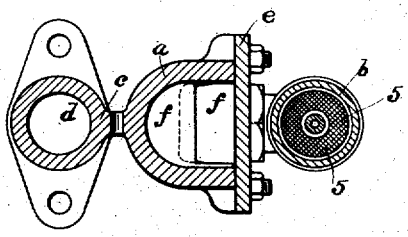

Referring now to the accompanying sheet of drawings, Figure 1 is a vertical section through the center of my vaporizer. Fig. 2 is an elevation of the same looking on the oil-supply device. Fig. 3 is a sectional plan of the vaporizer through the line *x x*.

In carrying my invention into effect I provide a vaporizer consisting of a vaporizer-chamber *a* and oil-supply device *b*, the chamber *a* being connected by a metal web or feather *c* to an exhaust-pipe *d*. I preferably cast part of the exhaust-pipe *d* and vaporizer-chamber *a* together, connecting the two, however, by this feather only, which serves to conduct heat from the exhaust to the vaporizer. The vaporizer-chamber *a* may be cylindrical in section, or it may be of any other convenient section. Moreover, it may be closed by a cover-plate *e* and divided into two or more parts to allow of ready access to the interior. I sometimes provide the chamber *a* and cover-plate *e* with baffle-plates *f* to cause the air to pass over an extended surface, or I fill the vaporizer-space with coarse copper gauze *h* or some metallic conducting material having large surfaces and sufficient interstices to allow the discharge of oil and air. A combination of baffle-plates and gauze or other material may, however, be employed.

I provide the vaporizer-chamber *a* with a charge outlet-passage *k*, leading to the engine inlet-valve, the passage *k* being controlled by a throttle-valve *m*.

Into the inlet-passage *j* I attach my oil-supply and air-admission device *b*. This consists of a small cylinder *n*, provided with wire-gauze surfaces *o o*, through which the air is drawn. At the lower part of this cylinder *n* I provide a perforated disk *p*, loosely fitting and free to slide in the cylinder *n*. It is pressed upward by a spiral spring *r*. The disk *p* carries with it a pin *q*, one of whose ends, *s*, projects into a recess *t*, bored in the end of a central oil-pipe *u*. The recess *t* is of somewhat larger diameter than the end *s* and the bore of the pipe *u*, so that a ball-valve *v*, slightly smaller in diameter than the recess *t*, supported on the pin end *s*, may, when the spring *r* presses the disk *p* and pin *q* upward be forced against a valve-face *y* at the upper end of the recess *t*. The lower end of the pin *q* passes through a guide *z* and then through a hole in the bottom of the cylinder *n*.

The central oil-pipe *u* may be held in position by any suitable means—such as, for instance, by providing it with two small collars 2 and 3, one of which, 2, rests on a support 4, secured to the cylinder *n* by arms 5 5, while the other collar, 3, is arranged so that on screwing a cap 6, provided with a support 7, similar to 4, into the cylinder *n* the pipe *u* is firmly held in the position shown in Fig. 1, while at the same time the wire-gauze partitions *o* are clamped between the supports 4 7 and the collars 2 3.

The pipe *u* is connected by any suitable means to an oil-supply pipe 8. I keep the petroleum-oil in the supply vessel under pressure of, say, twenty pounds per square inch above atmosphere. The spring *r* is sufficient to keep the ball-valve closed against this pressure. When, however, the engine makes its suction-stroke, it reduces the pressure within the vaporizer, the perforated disk *p* moves downward, the ball-valve *v* thus opens, and the oil is discharged on the perforated disk *p* and taken into the vaporizer with the air-supply. Here vaporization of the oil is partly effected by the heat and partly by the mixture being drawn through the wire-gauze *h*. The combustible mixture is now taken into the engine-cylinder, compressed, and exploded under compression by the electric spark or other convenient means. I regulate the engine by throttling the total charge. This is effected by the throttle-valve *m*, which is closed or partly closed by a governor or other means when the speed of the engine becomes excessive.

By connecting the exhaust-pipe to the vaporizer-chest by a rib only the heat-supply to the vaporizer is exactly proportioned to the temperature of the gases passing through the exhaust-pipe. In this way, whether running at light or heavy loads, just sufficient heat is always supplied to vaporize the oil, and the temperature never rises so high as to produce tar. I test the temperature of the entering charge after it leaves the vaporizer, and I regulate the rib-section of metal between the exhaust and the vaporizer so that the temperature of the charge leaving the vaporizer never greatly exceeds 212° Fahrenheit. Regulation of the rib-section may be effected by drilling holes 11 in the rib or feather connecting the vaporizer and exhaust pipe or by otherwise reducing its cross-sectional area. At this temperature, 212° Fahrenheit, or thereabout, no tar is produced and the engine works without blocking the piston.

I start the engine when cold either by heating the vaporizer by a lamp or by supplying it with a little light oil, such as "petrole," until the engine is warm. This light oil may be supplied by any suitable means—such as, for instance, by a pipe 12, led into the top of the oil-supply device *h*.

Having now described my invention, what I claim as new is—

1. The combination with the vaporizing-chamber of an internal-combustion engine; of an exhaust-conduit adjacent to said chamber with a connecting heat-conducting web of reduced thickness extending longitudinally of said conduit and exposed for perforation.

2. The combination with the vaporizing-chamber of an internal-combustion engine; of an air and oil mixing chamber in connection at one end with said vaporizing-chamber and open at the other end for the admission of atmospheric air and having one or more supports centrally located with respect to said open end; an oil-supply pipe entering the latter and extending through said supports and having one or more collars to confront the latter; one or more perforated partitions extending across the air-entrance and around the said oil-pipe between the collars thereof and the supports; and a spring-pressed valve normally closing the oil-pipe.

3. The combination with the vaporizing-chamber of an internal-combustion engine; of an exhaust-conduit adjacent to said chamber with a connecting heat-conducting web of regulated sectional area.

4. The combination with the vaporizing-chamber of an internal-combustion engine; of an exhaust-conduit adjacent to said chamber with a connecting heat-conducting web of reduced thickness extending longitudinally of said conduit and exposed for cross-sectional reduction.

In witness whereof I have hereunto set my hand this 23d day of February, A. D. 1903.

CHARLES ERNEST DAWSON.

Witnesses:
WM. SECHER,
HARRY SUSSER.